(12) United States Patent
Mottishaw et al.

(10) Patent No.: US 7,894,356 B2
(45) Date of Patent: Feb. 22, 2011

(54) SYSTEM AND METHOD FOR MEASURING NETWORK PERFORMANCE USING REAL NETWORK TRAFFIC

(75) Inventors: Peter Mottishaw, Edinburgh (GB); Slawomir K. Ilnicki, Los Altos Hills, CA (US); Lance A. Tatman, Granite Bay, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 1210 days.

(21) Appl. No.: 11/316,779

(22) Filed: Dec. 23, 2005

(65) Prior Publication Data

US 2007/0147258 A1 Jun. 28, 2007

(51) Int. Cl.
*H04J 3/14* (2006.01)

(52) U.S. Cl. .................................................. 370/252
(58) Field of Classification Search .......... 370/241, 370/252, 235, 237, 250, 251, 392, 394, 474; 709/200

See application file for complete search history.

(56) References Cited

U.S. PATENT DOCUMENTS

| 5,315,580 | A | 5/1994 | Phaal |
|---|---|---|---|
| 5,521,907 | A | 5/1996 | Ennis |
| 6,363,056 | B1 | 3/2002 | Beigi |
| 6,442,141 | B1 | 8/2002 | Borella et al. |
| 6,560,720 | B1 | 5/2003 | Chirashnya et al. |
| 6,563,796 | B1 | 5/2003 | Saito |
| 6,820,042 | B1 | 11/2004 | Cohen et al. |
| 6,862,291 | B2 | 3/2005 | Talpade et al. |
| 6,886,029 | B1 | 4/2005 | Pecus et al. |
| 7,406,082 | B2 * | 7/2008 | Nagarajan et al. ........... 370/394 |
| 2004/0111461 | A1 * | 6/2004 | Claudatos et al. ........... 709/200 |
| 2004/0151117 | A1 * | 8/2004 | Charcranoon ............... 370/235 |
| 2005/0185587 | A1 * | 8/2005 | Klinker ..................... 370/237 |

FOREIGN PATENT DOCUMENTS

| EP | 1202491 | 5/2002 |
|---|---|---|
| EP | 1589692 | 10/2005 |

OTHER PUBLICATIONS

European Patent Office, Communication with Search Report, Sep. 9, 2008.

* cited by examiner

*Primary Examiner*—Seema S Rao
*Assistant Examiner*—Leon Andrews
(74) *Attorney, Agent, or Firm*—Volentine & Whitt, PLLC (57) ABSTRACT

A system and method for measuring network performance include a first element in a network, the first element operable to receive a data packet and to create a clone packet based on the data packet, the clone packet having a destination the same as a destination of the data packet and having information identifying the clone packet as a clone, the first element operable to insert the clone packet into a data stream with the data packet.

16 Claims, 8 Drawing Sheets

SYSTEM AND METHOD FOR MEASURING NETWORK PERFORMANCE USING REAL NETWORK TRAFFIC

CROSS-REFERENCE TO RELATED APPLICATIONS

This application is related to U.S. patent application Ser. No. 11/127,486, entitled "PROTOCOL-GENERIC EAVES-DROPPING NETWORK," filed May 12, 2005, and to U.S. patent application Ser. No. 11/127,350, entitled "IN-LINE NETWORK SIMULATOR," filed May 12, 2005, the disclosures of which are hereby incorporated herein by reference.

TECHNICAL FIELD

This application relates to measuring network performance.

BACKGROUND OF THE INVENTION

When an owner of a network sells service to another party, for instance, when a network provider sells use of the network to a website host, the seller will usually provide the buyer with a Service Level Agreement (SLA). An SLA is a part of the contract that sets out the network performance that the buyer can expect. Performance criteria usually include, among other things, bandwidth availability, packet delay, packet delay variation, and packet loss. In order to provide SLAs, a network provider preferably has access to network performance measurements.

Prior solutions for measuring packet delay, delay variation, and packet loss usually employ active tests that simulate a user's experience by generating packets expressly for the testing process. The packets are time stamped at each end so that the measurements may be made. One disadvantage to this method is that injected synthetic data may not be representative of user data traffic. For instance, these systems may send testing packets in a pure random or Poisson distribution, or at regularly timed intervals. However, packets in real network traffic may not be random or evenly spaced.

In one example, a traceroute utility sends separate packets to each intermediate node and measures packet delay based on round trip delay. On a network, the round trip packet delay may not accurately represent one-way packet delay because forward and backward paths may be different. In addition, utilities such as Packet Internet Groper (ping) and traceroute provide round trip packet delay and packet loss only for Internet Control Message Protocol (ICMP) packets; however routing/switching nodes often treat ICMP packets differently than predominant types of data like TCP or UDP traffic.

Further, traditional active tests are limited in that each probe is configured for a specific measurement and location or destination. Traditional systems make no provision for dynamic configuration of the probes based on current usage.

Systems that use passive measurements and packet sampling (e.g., NETFLOW™, available from CISCO SYSTEMS, INC.™, and the like) provide only measurements of traffic flow (i.e., volume and number of flows) at specific points by looking at traffic rather than generating testing packets. These systems are not used for measuring packet delay, delay variation, or packet loss, because current Internet Protocol v4 (IPv4) traffic provides no way to measure such phenomena without modifying the packets in the traffic. However, passive systems may be good tools for some forms of network capacity planning, troubleshooting, and even some forms of intrusion detection, such as denial of service (DOS) attacks.

BRIEF SUMMARY OF THE INVENTION

According to one embodiment, a system for measuring network performance includes a first element in a network, the first element operable to receive a data packet and to create a clone packet based on the data packet, the clone packet having a destination the same as a destination of the data packet and having information identifying the clone packet as a clone, the first element operable to insert the clone packet into a data stream following the original intercepted data packet. Additionally, according to another embodiment, a method for measuring performance of a network includes receiving a data packet from a source by a first element in the network, generating a clone packet based on the data packet, the clone packet including information identifying the clone packet as a clone, and inserting the clone packet into a data stream with the data packet. In one example, the system times the delay of the clone packet in order to calculate a delay that reflects delay of actual data. In another example, the clone packet is used to set up packet filters in downstream network elements, wherein the packet filters monitor the network traffic.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1A:
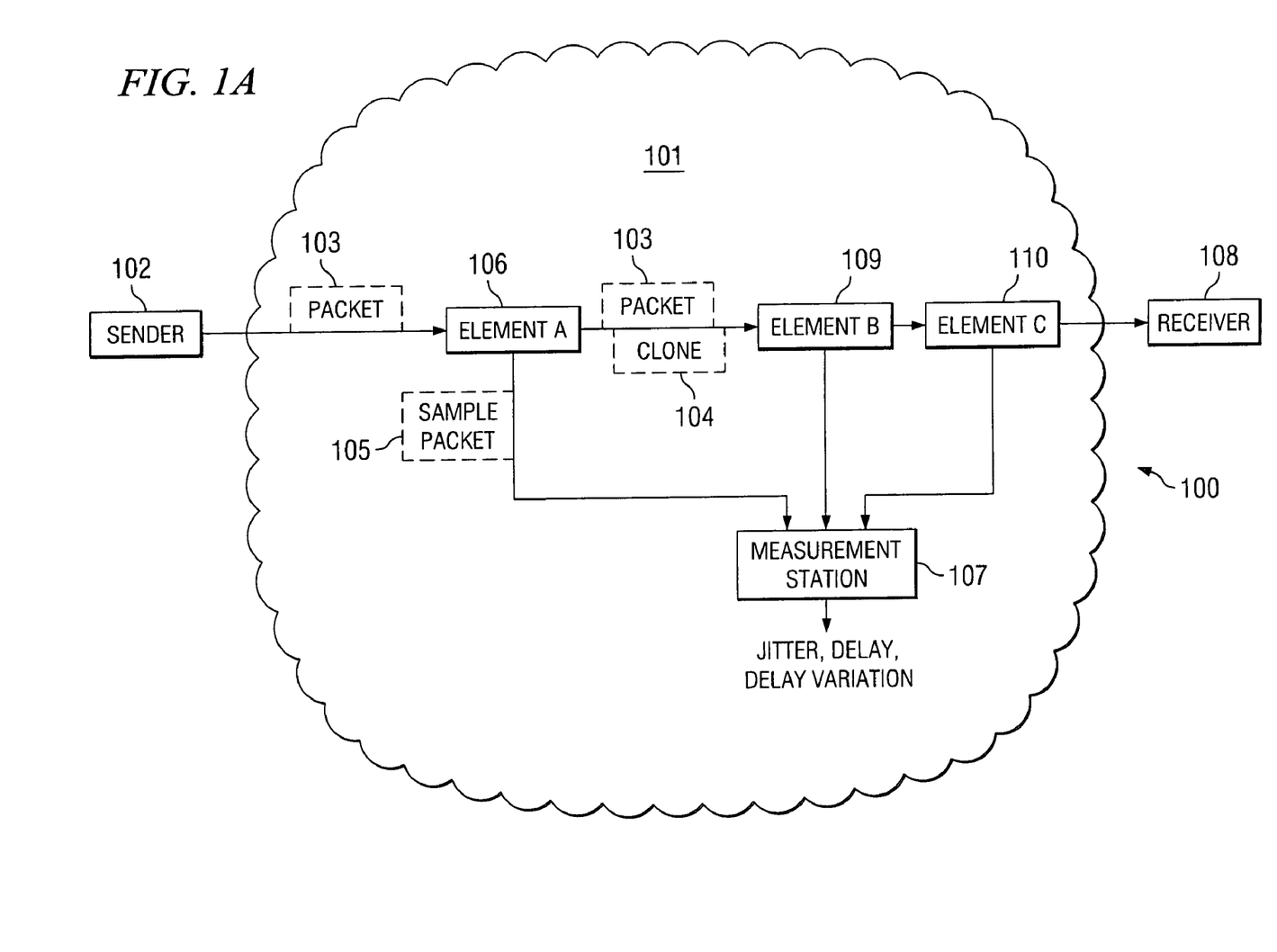
FIGS. 1A-C illustrate an exemplary system for measuring network performance adapted according to at least one embodiment of the invention.
Figure 1B:
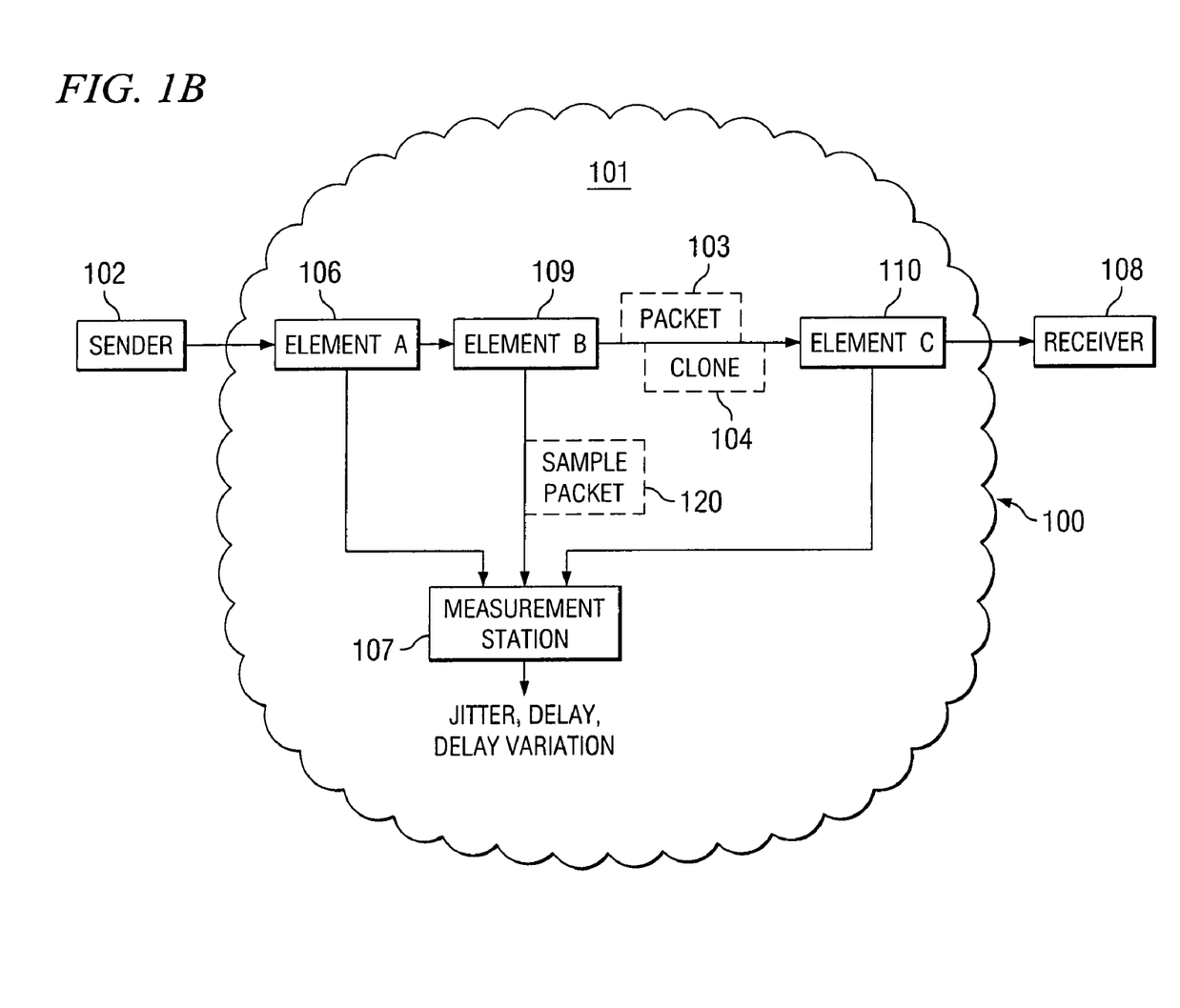
Figure 1C:
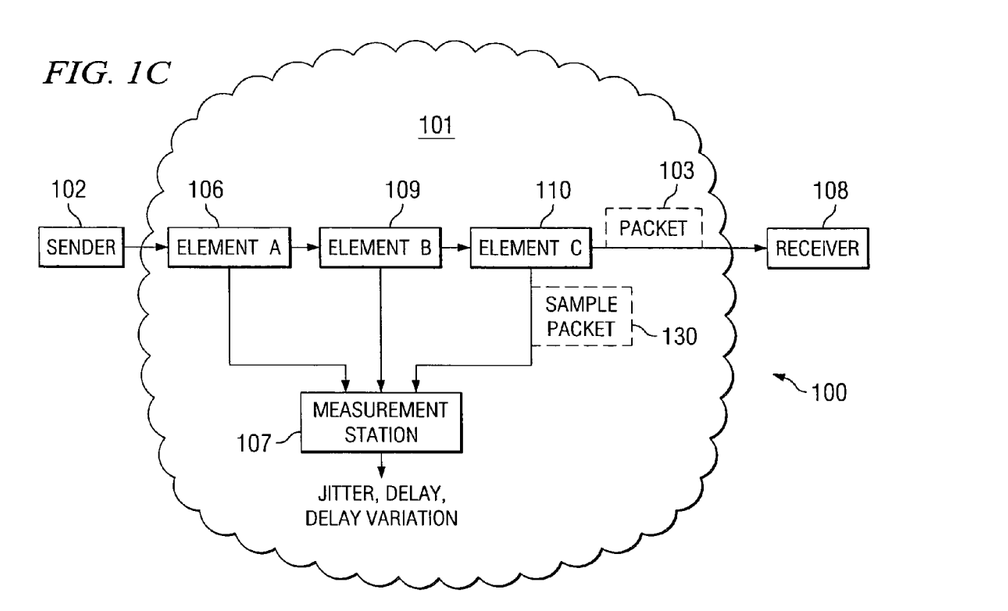

FIGS. 1A-C illustrate exemplary system 100 for measuring network performance adapted according to at least one embodiment of the invention. FIGS. 1A-C show a chronological progression of packets through network 101.

In FIG. 1A, sender 102 sends packet 103 to receiver (destination) 108 over network 101. Network 101 includes three network elements, labeled element A 106, element B 109, and element C 110 that each receive packet 103 and send it through network 101. Each network element 106, 109, and 110 may include, for example, a data probe and a router. Such configuration is described in more detail in FIG. 1D, below. Measurement station 107 calculates performance parameters for the network, as described more fully below. Network 101 may comprise the Internet or other Wide Area Network (WAN), a Local Area Network (LAN), a Public Switched Telephone Network (PSTN), any combination of the foregoing, and/or any other communication network now known or later developed that permits sender 102 to communicate data to receiver 108. Other paths through network 101 may exist but are not shown herein for simplicity. Packet 103 is not limited by type and may be any kind of packet in various levels of the Open System Interconnection (OSI) model, such as an Internet Protocol (IP) packet, a Voice Over Internet Protocol (VOIP) packet, an Asynchronous Transfer Mode (ATM) cell, and the like. Further, packet 103 may be part of a data flow that contains many other packets that are not shown herein. In this case, other packets of the data flow may be processed in a manner described hereafter for packet 103.

In this example, each element 106, 109, 110 includes probe functionality with time synchronization, as described below. Thus, element 106, which acts as an ingress border node in this example, not only routes the data stream, but also acts as a probe in that it samples packets and performs other network performance measurement functions. Element 106 samples the data stream by selecting packet 103 according to its sampling algorithm. Various sampling algorithms exist in the art, such as the methods described in U.S. Pat. No. 5,315,580 to Phaal et al. Phaal et al. describe various ways to statistically sample a data stream so that the resulting samples, over time, reflect user traffic. Some examples statistically approximate a random sampling. The Phaal et al. methods may be adapted for use (e.g., by node 106) in some embodiments of the present invention. Other methods include sampling all packets or sampling packets based on information therein, as described below.

Element 106 clones sampled data packet 103 to produce clone packet 104. Clone packet 104 in this example has almost the same header information and packet/frame length as data packet 103, but its payload contains information identifying it as a clone. For instance, its payload may contain a unique identifier supplied by element 106 and the network address of measurement station 107. For instance, clone packet 104, for the purpose of being identified as a clone packet, may include a modified destination port that is unique to measuring (i.e., clone) packets. Further, clone packet 104 may contain other high layer (higher than transport/network layer) headers because user data packets may have more than three layer headers, such as in the case of Voice over Internet (VOIP) packets, which include an Ethernet header, followed by an IP header, a UDP header and a Realtime Transport Protocol (RTP) header. Further, the payload may contain authentication information to prevent impersonation attacks. The packet payload of clone packet 104 may also contain a variety of other information, such as information originally contained in the packet header of data packet 103, the original destination port of data packet 103, for example.

Element 106 then inserts clone packet 104 into the data stream soon after (or before) data packet 103 leaves element 106. That is, clone packet 104 is routed along the same path through network 101 as packet 103. Further, element 106 creates sample packet 105 by encapsulating a copy of clone packet 104 with a unique identification from element 106 and a timestamp that shows when clone packet 104 was inserted into the data stream. For example, the timestamp may show when the first bit of clone packet 104 left element 106. This is an accurate way to reflect when clone packet 104 was inserted into the stream. Accuracy may further be improved by ensuring that the timestamp reflects the time when clone packet 104 leaves the node portion of element 106 and does not include any unpredictable waiting time in a probe portion of element 106. The unique identification may be, for example, a tapping device MAC address to identify node 106 plus a sequence number to identify data packet 103 and/or clone packet 104. Rather than encapsulating clone packet 104, sample packet 105 may include as little as clone packet identification plus the timestamp. Element 106 sends sample packet 105 to measurement station 107 where it is available for subsequent correlation and analysis. For example, measurement station 107 can perform a packet loss measurement by looking for the presence of a corresponding sample packet from a downstream probe.

Clone packet 104 flows through network 101 toward destination 108 of data packet 103. With regard to routing, clone packet 104 is treated as normal user traffic by network 101. In other words, element 106, 109, and 110 route clone packet 104 through the same path as data packet 103. However, as clone packet 104 flows through network 101, elements 109 and 110 each recognize it as a clone packet and copy its unique ID into a time-stamped sample packet, such as packet 105. Each element 106, 109, and 110 may send sample packets, such as sample packet 105, to measurement station 107 as they route clone packet 104 through the path. In another example embodiment, each probe 106, 109, and 110 collects time stamps and unique IDs for a plurality of received clone packets, sending the information periodically as bundles to measurement unit 107 without including encapsulated copies of each clone packet 104. Further, each probe 106, 109, and 110 may perform data reduction on the information before sending it to measurement station 107.

FIG. 1B depicts packets 103 and 104 as they move through network 101 past element 106. When element 109 receives packet 103, it routes it as it would any other data packet, in this case, by sending it on to element 110. Element 109 recognizes clone packet 104 as a clone and creates sample packet 120 (with a timestamp) accordingly. Element 109 sends sample packet 120 to measurement unit 107. Measurement unit 107 is then able to use the information in sample packets 105 (FIG. 1A) and 120 to determine that they each correspond to clone packet 104. Thus, for instance, measurement station 107 can measure parameters of the communication of clone packet 104 from node 106 to node 109, such as the amount of time for communication of packet 104 from node 106 to node 109. Further, node 109 routes clone packet 104 along the same path as data packet 103.

FIG. 1C illustrates how node 110, acting as an egress border node, handles packets 103 and 104. When element 110 receives packet 103, it routes it as it would any other data packet. In this case, it sends packet 103 on to receiver 108, according to the destination information in the header. When element 110 receives clone packet 104 (FIGS. 1A and B) it recognizes it as a clone and creates sample packet 130 in a manner similar to that described above. Element 110 then sends sample packet 130 to measurement unit 107. However, as an egress border node, element 110 may remove clone packet 104 from the data stream, as clone packet 104 may serve no purpose outside of network 101. Alternatively, element 110 may simply send clone packet 104 on to receiver 108, where clone packet 104 is ignored because its port assignment is different from any ports used by receiver application 108, or receiver 108 may be operable to otherwise use clone packet 104 in some way.

The embodiments described above create clone packets to send downstream, while including the timestamps in the sample packets only; however, the invention is not so limited. In an example embodiment, clone packets include one or more timestamps. Then, when each clone packet reaches an egress border node, the clone packets (or sample packets including the timestamps) are sent to measurement station 107.

It should be noted that in the data streams of FIGS. 1A-C, elements 106, 109, and 110 may or may not route the clone packets and original data packets along the same path. For example, once the clone packet is created or received, an element may route it along the same path or a different path as the original data packet. It should be noted that there is no requirement for any particular temporal relationship between the routing of the original packet and the routing of the clone packet. Various timing relationships between original data packets and clone packets are within the scope of various embodiments of the invention.

Figure 1D:
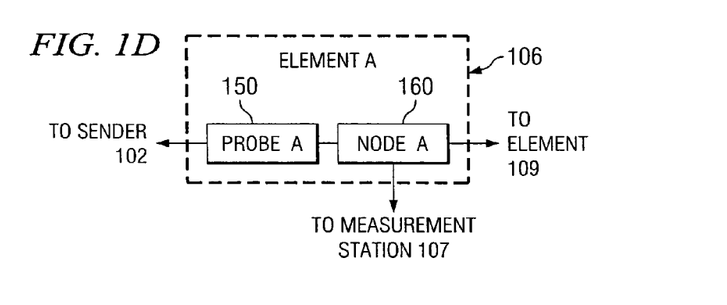
FIGS. 1D-E illustrate more detailed views of an exemplary network element adapted according to at least one embodiment of the invention.

As mentioned above, network elements 106, 109, and 110 may include node and probe functionality. FIG. 1D illustrates a possible configuration of element 106 according to at least one embodiment. As shown, network element 106 includes probe 150 and node 160 (e.g., a router). Probe 150 may be a line card or a pluggable interface converter into the line card, such as a GBIC (GigaBit Interface Converter) or a SFF (Small Form Factor) pluggable interface converter. Thus, probe 150 may be an integral part of routing/switching node 160. Nodes, such as node 160, introduce at least some delays in network 101, and, in this example, nodes are the sources of the delay of interest.

In FIG. 1D, probe 150 is at the ingress point/interface of node 160. Probe 150 generates clone packet 104 and sample packet 105. Probe 150 feeds into node 160. Node 160 forwards data packet 103 and clone packet 104 to network element 109, which also includes a node portion (not shown). Node 160 forwards sample packet 105 to measurement station 107.

Figure 1E:
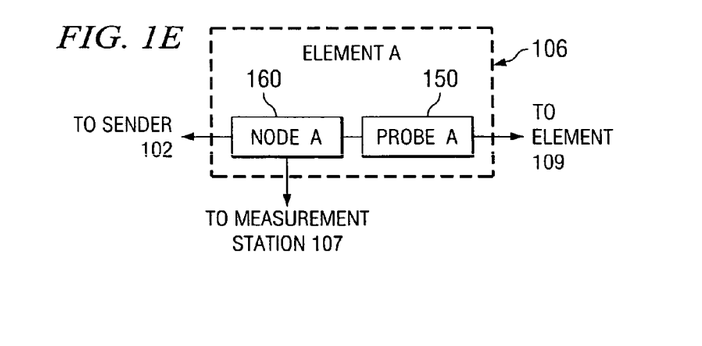

In another example, probe 150 is at the egress point/interface of node 160, as in FIG. 1E. FIG. 1E illustrates a possible configuration of element 106 according to at least one embodiment. In embodiments wherein probe 150 is at the egress of node 160, then it is possible to include the delay of node 160 in sample packet 105 (along with any previous upstream delays).

Probe 150 at the egress of node 160 creates sample packet 105 based on clone 104 by including a timestamp and sends sample packet 105 back to node 160 in order to be forwarded to measurement station 107. However, depending on network configuration, probe 150 at the egress point of node 160 may send sample packet 105 following clone 104 and data packet 103 to network elements 109 and 110, either one of which could then forward sample packet 105 to measurement station 107. In one aspect, sending sample packets from each node may appear redundant; however, it may provide higher reliability than a system wherein timestamps are collected at egress nodes and sent in bunches to measurement station 107.

Various advantages may be realized through some embodiments. For instance, when using an approximately random sampling technique for actual traffic, over time, system 100 provides a reliable indication of network performance that may exceed the accuracy of the performance measurement provided by current systems, such as NETFLOW™.

In the examples of FIGS. 1A-C, the packet sampling addresses the entire data stream through network 101. However, it is possible to narrow the focus to specific types of traffic in the data stream. For example, packet filters may be used to sample only certain kinds of traffic (e.g., VOIP traffic) or traffic from certain senders or to certain destinations.

Figure 2A:
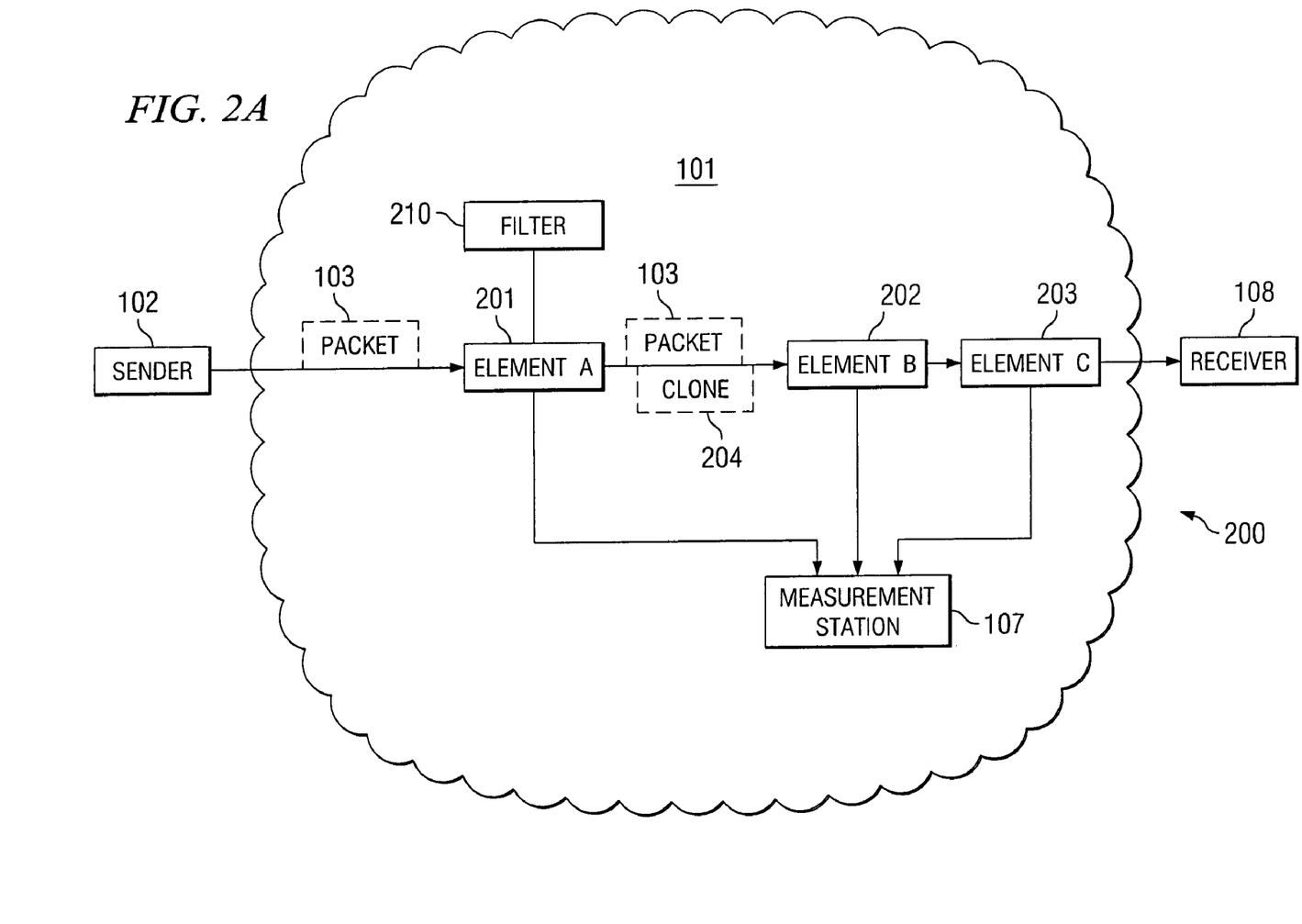
FIGS. 2A-C illustrate an exemplary system for measuring network performance adapted according to at least one embodiment of the invention.
Figure 2B:
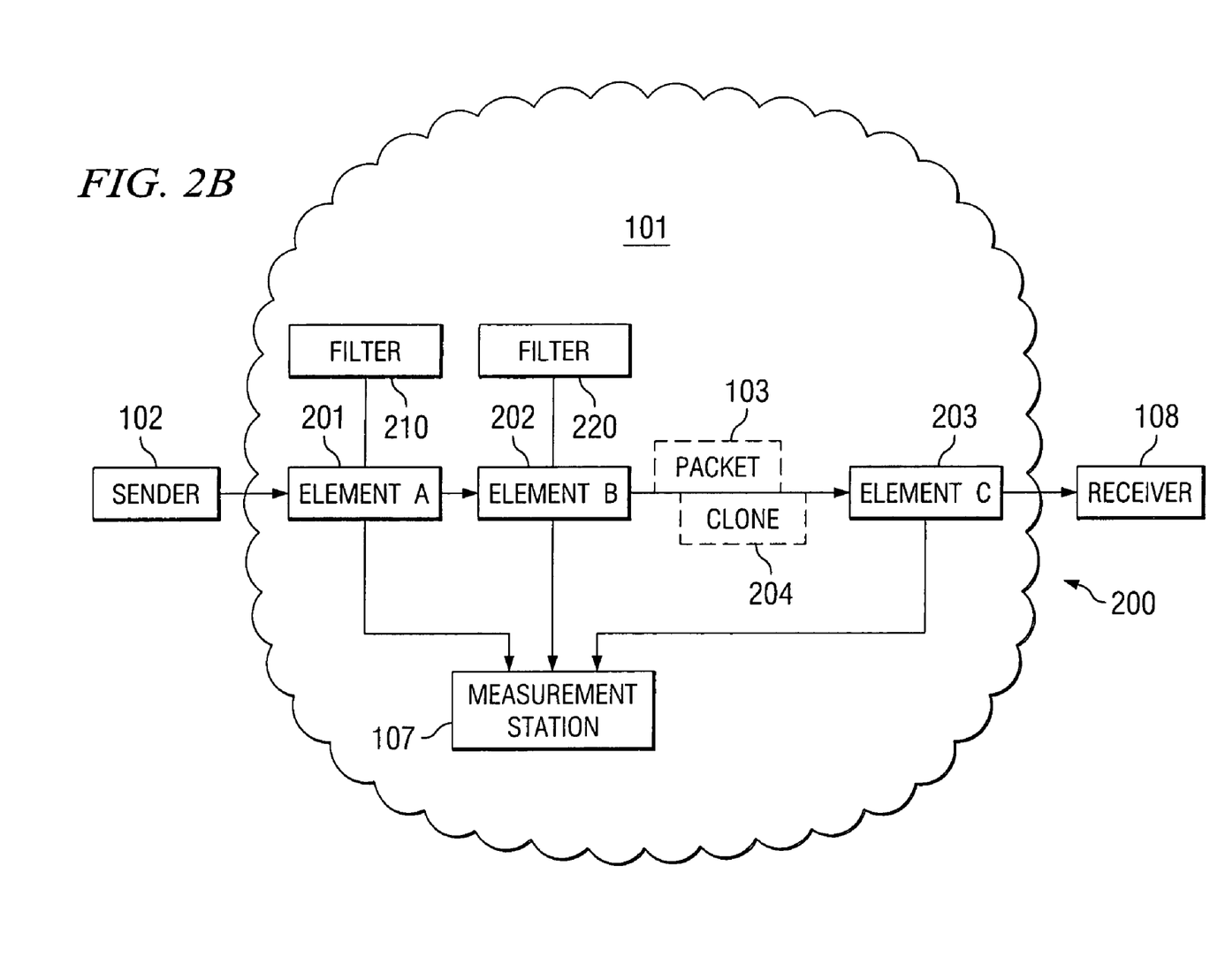
Figure 2C:
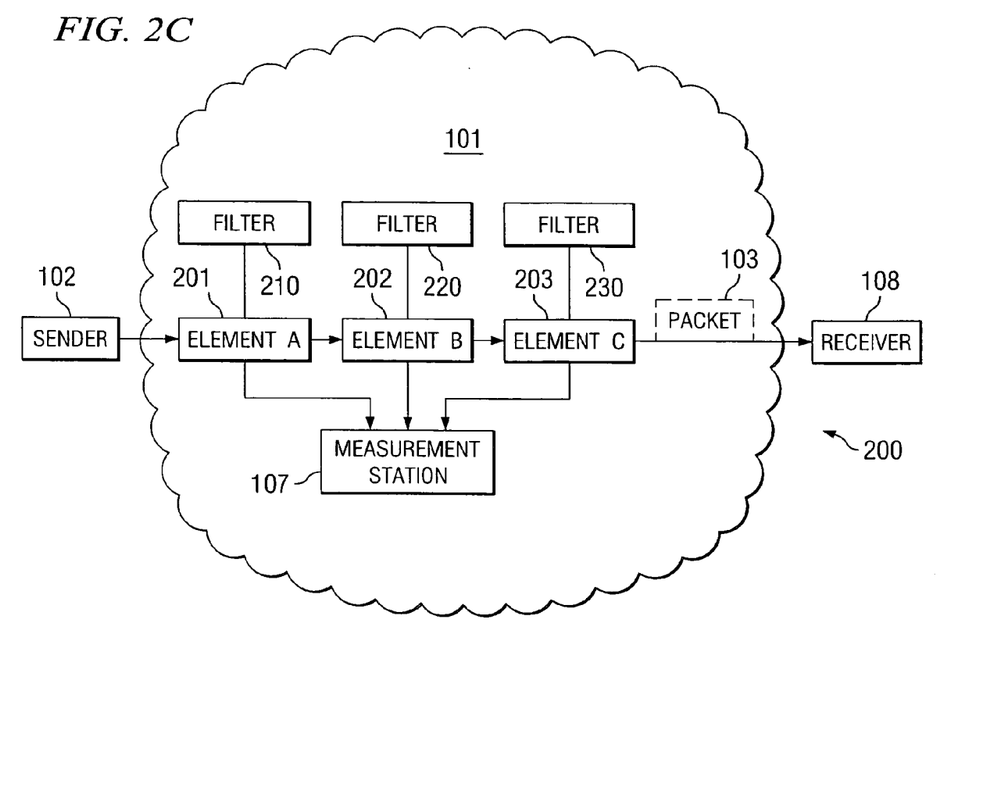

FIGS. 2A-C illustrate exemplary system 200 for measuring network performance adapted according to at least one embodiment of the invention. Specifically, FIG. 2A illustrates exemplary system 200 that is operable to employ packet filters to limit the scope or "focus" of the performance management. Sender application 102 sends data packet 103 through network 101 via the path shown. Network element 201 receives data packet 103 and examines it for certain characteristics. In this example, element 201 is an ingress border node that is programmed to recognize certain traffic, to sample that traffic, and to generate clone packet 204. Among other things, the functionality of element 201 includes packet filtering operation 210 that is programmed to perform the specific recognizing and sampling according to criteria defined, for example, by a user or computer algorithm. As element 201 inspects the data stream, it recognizes that data packet 103 conforms to the criteria, sampling data packet 103 in response. In a manner similar to that described above with regard to FIGS. 1A-C, element 201 creates clone packet 204. However, in this embodiment, clone packet 204 contains information in its header and/or payload that is used by downstream elements 202 and 203 to configure packet filters. The information contains not only criteria for sampling, but also contains a variety of information describing the filters, such as their time-to-live (TTL). Alternatively, various information describing the filters can be programmed directly into element 202 and 203, though such an approach may result in system 200 requiring more manual steps, thereby depriving the user of the advantages of automatic configuration.

FIG. 2B illustrates the operation of intermediate element 202 as it passes clone packet 204. No extraordinary action is taken with regard to data packet 103, as element 202 simply passes data packet 103 in the normal course. When element 202 recognizes clone packet 204, it reads the information in the header and/or payload of packet 210 and creates filter 220 in response thereto.

FIG. 2C illustrates the operation of network element 203 that acts as an egress border node as it processes clone packet 204. Element 203 passes data packet 103 in the normal course and removes clone packet 204 from the data stream. Alternatively, element 203 may simply send clone packet 204 on to receiver 108, where clone packet 204 is ignored because its port assignment is different from any ports used by receiver application 108. Further, similar to the operation performed by element 202, element 203 reads the information in the payload of clone packet 204 and creates filter 230 in response thereto. As shown, a clone packet, such as clone packet 204, can be used in system 200 for automatic configuration of packet filters.

System 100 of FIGS. 1A-C is referred to as an "active system" because it generates test packets (i.e., clone packets) in the data stream. System 200 of FIGS. 2A-C is passive, at least with respect to the operation of filters 220 and 230 since filters 220 and 230 do not generate test packets in the data stream, but rather, merely monitor the data stream. Previous passive systems have only been able to measure traffic volume; however, system 200 can be used to measure packet delay, delay variation, and packet loss. In this case the first packet is cloned and sent through network 101 as described above. Further, the filter criteria for packet filters 210, 220, and 230 are set for specific traffic flows, e.g., full IP address source and destination, ports (destination and source), protocol type, and the like. As the data stream continues, data packets that conform to the criteria are sampled as they pass through each of filters 210, 220, and 230. In response, elements 201-203 create respective sample packets similar to sample packets 105, 120, and 130 of FIGS. 1A-C and send them on to measurement unit 107 for analysis. Accordingly, exemplary system 200 generates one clone packet for each set of criteria rather than one clone packet for each sampled data packet. The result is that system 200 creates fewer clone packets than does system 100 of FIGS. 1A-C, which results in reduced measurement traffic and accurately reflects the behavior of real traffic because it measures real traffic.

It should be noted that in system 100, of FIGS. 1A-C, the sampling algorithm discussed may include packet filtering functionality, such that certain types of packets are sampled in addition to or in place of the statistically random sampling used in the example. Some embodiments of systems 100 and 200 may provide the same ability to measure network performance, and in fact, systems 100 and 200 may be interchangeable in some applications. The number and types of available packet filters is usually determined by the resources available in network nodes. In fact, due to limited resources, some nodes are not always able to set up packet filters. In some systems, packet filters include setup priorities, such that a node with limited resources sets up higher priority filters first or to the exclusion of lower priority filters. Further, nodes 210, 220, and 230 may deploy a variety of methods for managing packet filter caches, though it may be desirable that those methods are used consistently within any one measuring system.

In an example, system 200 measures delay variation for VOIP packets in the data stream. Filters 210, 220, and 230 look at the data stream and sample the VOIP packets, creating sample packets at each node for each VOIP packet. Delay for each packet is calculated at measurement unit 107 from the sample packets. Then, measurement unit 107 makes a measurement of the variation in the delays of the VOIP packets. (Note: This example system measures loss and delay not only between ingress and egress of the network, but can also provide these same metrics hop-by-hop through the network which is an aid to isolating performance issues).

An advantage of some embodiments of systems 100 and 200 over current systems is that results are based on real traffic and may be provided as the data is flowing through the network. A further advantage of some embodiments of system 200 over current systems is that the performance measurements can be calculated without manual configuration of downstream nodes. Further, using packet filters to test network performance with regard to traffic type or destination facilitates troubleshooting by allowing a technician to isolate packet types and paths that have the most performance issues.

Figure 3:
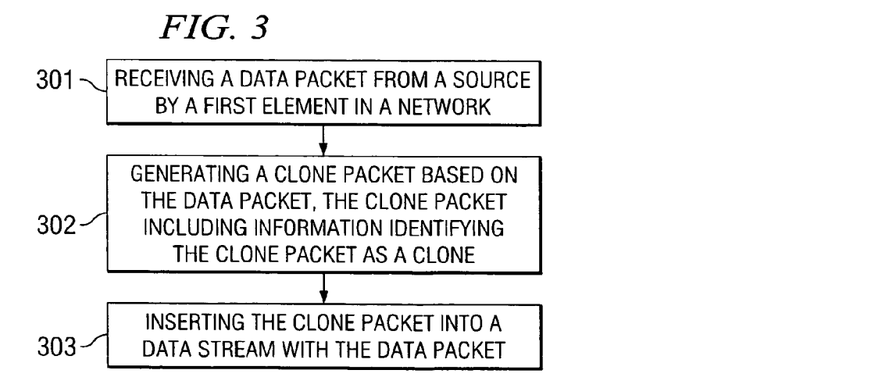
FIG. 3 is a flowchart of an exemplary method that may be performed by the system of FIGS. 1A-C or the system of FIG. 2A-C.

FIG. 3 is a flowchart of example method 300 that may be performed by system 100 (FIGS. 1A-C) or system 200 (FIG. 2A-C). In step 301, a first element in a network receives a data packet from a source. In this example, the data packet is live data—that is, actual user traffic. The element may be any computer device associated with the network, and in many embodiments, is a data probe. Further, the first element is usually (but not required to be) associated with an ingress border node for the network.

In step 302, the element generates a clone packet based on the data packet, and the clone packet includes information identifying the clone packet as a clone. The clone packet does not need to be an exact replica of the data packet, but it does include enough information to identify it as the same packet type as the data packet (e.g., IP, FTP, and the like) and destined for the same network address as the data packet. In addition, in some embodiments, as described above, the clone packet may or may not include a timestamp. The clone packet may include a different destination port than the data packet, and the payload information in each may differ substantially. Further, the clone packet includes information identifying it as a clone. Such information may be a specific piece of data in the payload or header, and in some embodiments may be a unique port designation that is recognized by the network probes to indicate a clone.

In step 303, the element inserts the clone packet into a data stream with the data packet. Thus, the clone packet usually proceeds along the same path through the network as the data packet.

Figure 4:
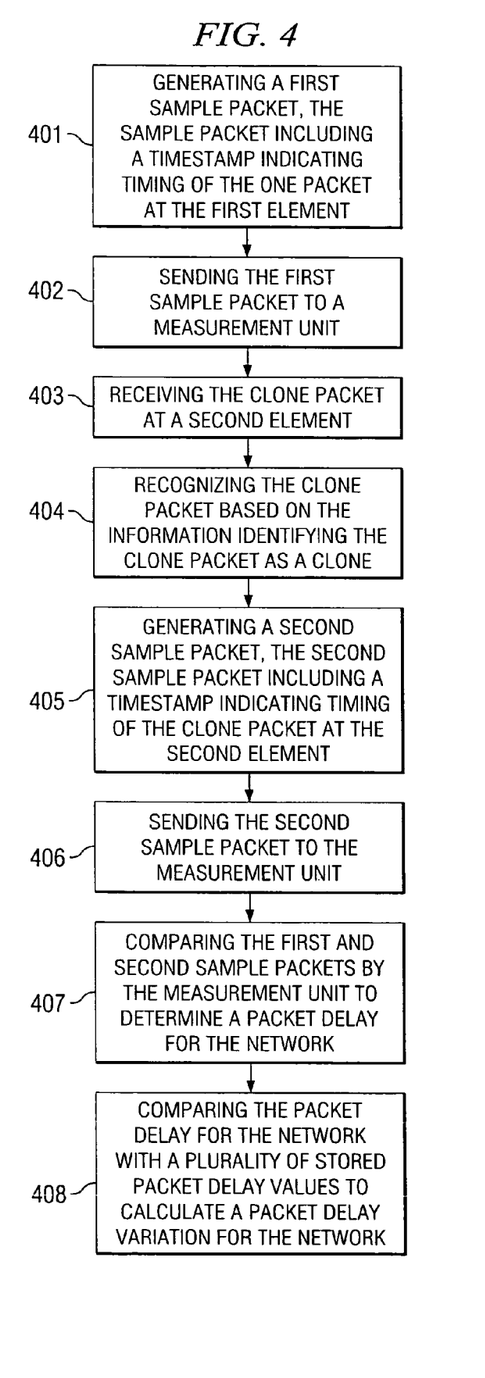
FIG. 4 is a flowchart of an exemplary method that may be performed by the system of FIGS. 1A-C after the system performs the method of FIG. 3.

FIG. 4 is a flowchart of example method 400 that may be performed by system 100 (FIGS. 1A-C) after the system performs method 300 (FIG. 3). In step 401, the element generates a first sample packet including a timestamp indicating timing of the clone packet at the first probe. The sample packet may also include a unique identifier that identifies the element and the corresponding clone and/or data packets. The timestamp allows a measuring unit to calculate delay, while the unique identifier allows the measuring unit to correlate the sample packets based on clone packet, data packet, and/or element. In step 402, the element sends the first sample packet to the measurement unit. It should be noted that the first sample packet, in this example, is not part of the same data stream that includes the data packet and the clone packet because it is sent to the measurement unit rather than toward a data packet destination.

In step 403, a second network element receives the clone packet. The second element may be a downstream element before an egress of the network, or it may be an element acting as an egress border node. The second element is part of the path for both the data packet and clone packet on the way to the destination application.

In step 404, the second element recognizes the clone packet based on the information identifying the clone packet as a clone. In other words, the second element inspects headers of the packets in the data stream and is operable to recognize clone packets based thereon.

In step 405, the second element generates a second sample packet that includes a timestamp indicating timing of the clone packet at the second element. The second sample packet is similar to the first sample packet in step 401. However, the second sample packet, for example, includes information indicating when the clone packet left the node of the second element. The second sample packet may also include information identifying the second element, the clone packet, and/or the data packet.

In step 406, the second element sends the second sample packet to the measurement unit. In step 407, the measurement unit compares the first and second sample packets to determine a packet delay for the network. The timestamps in the sample packets indicate the timing of the packets at each element as they traverse the network, and the measurement unit uses the timestamps to calculate packet delay. In this way, the measurement system is operable to calculate packet delays based on actual traffic rather than synthetic traffic.

In step 408, the measurement unit compares the packet delay for the network with a plurality of stored packet delay values to calculate a packet delay variation for the network. In addition to packet delay variation, the measurement unit can calculate packet loss.

Figure 5:
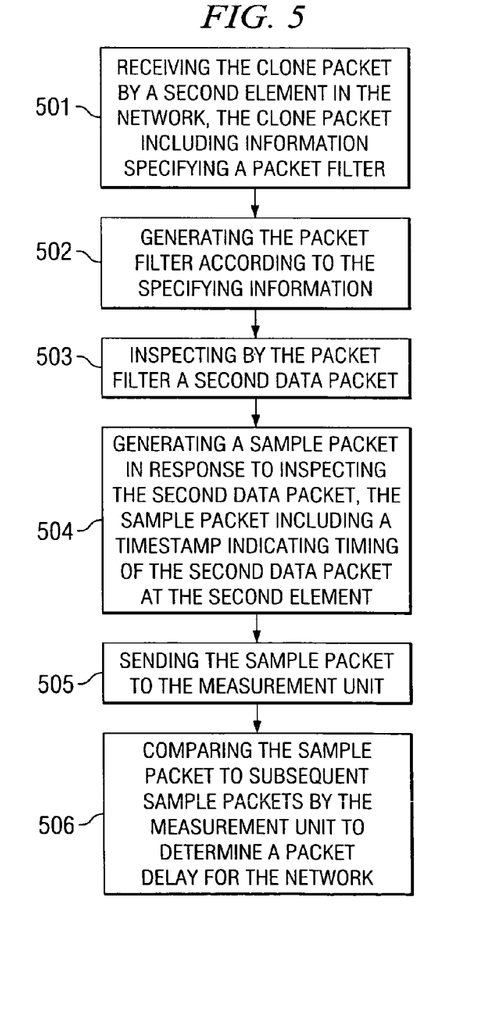
FIG. 5 is a flowchart of an exemplary method that may be performed by the system of FIG. 2A-C after performing the method of FIG. 3.

FIG. 5 is a flowchart of example method 500 that may be performed by system 200 (FIG. 2A-C) after performing method 300 (FIG. 3). In step 501, a successive element receives the clone packet, and the clone packet includes information specifying a packet filter. In one example, the header and/or payload of the clone packet includes an instruction that triggers probes to generate packet filters. While the information can include an instruction, an instruction is not required to be in the clone packet. For instance, the clone packet may simply include a description of the packet filter, while the downstream probes are programmed to generate packet filters when they find descriptions. The invention is not limited to any particular method of specifying the packet filter. In step 502, the successive element generates the packet filter according to the specifying information in the clone packet. In other words, it configures the packet filter according to the specifying information, which can include a variety of parameters for the filter, including time-to-live (TTL), packet criteria, and the like.

In step 503, once the packet filter is configured, the packet filter inspects the data packets until its TTL expires. In one example, the packet filter looks at the data stream, inspecting the packets therein to determine if they match predefined criteria in the filter. Accordingly, the packet filter performs selective sampling based on the criteria. Some examples of criteria include packet type, destination address, and the like. When a packet does match the criteria, action is taken.

In step 504, the successive element generates a sample packet in response to inspecting a successive data packet that matches the packet filter, and the sample packet includes a timestamp indicating timing of the second data packet at the successive element. In this example, the element generates sample packets in response to the packet filter inspecting the data packets. This is in contrast to system 100 (FIGS. 1A-C), wherein the elements generate sample packets in response to detecting clone packets. The sample packets of step 504 may be similar to the sample packets of steps 401 and 405, above. In step 505, the element sends the sample packet to the measurement unit.

In step 506, the measuring unit compares the sample packet to subsequent sample packets to determine a packet delay for the network. In this example, the subsequent sample packets correspond to the same data packet so that one packet delay is calculated. The measurement unit may make other packet delay measurements for other packets in the data stream in order to get a more representative view of the network delay. In fact, in some embodiments, the packet filters may send sample packets for every packet that is directed to a certain destination address or is of a particular packet type. As mentioned above with regard to step 408, the measurement unit may also calculate delay variation, packet loss, and the like.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 6:
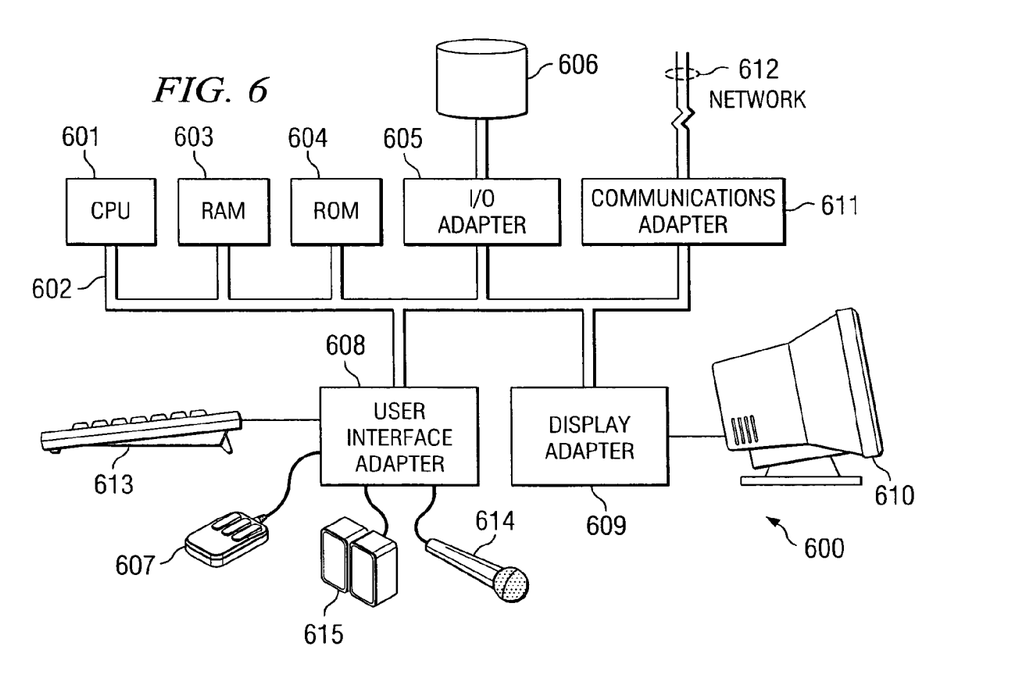
FIG. 6 is an illustration of an exemplary computer system adapted according to embodiments of the present invention.

FIG. 6 illustrates an example computer system 600 adapted according to embodiments of the present invention. That is, computer system 600 comprises an exemplary system on which embodiments of the present invention may be implemented (such as elements 106, 109, and 100 of the example implementation of FIGS. 1A-C and measurement station 107 of the example implementation of FIGS. 1A-C and 2A-C). Central processing unit (CPU) 601 is coupled to system bus 602. CPU 601 may be any general purpose CPU, and the present invention is not restricted by the architecture of CPU 601 as long as CPU 601 supports the inventive operations as described herein. CPU 601 may execute the various logical instructions according to embodiments of the present invention. For example, CPU 601 may execute machine-level instructions according to the exemplary operational flows described above in conjunction with FIGS. 3-5.

Computer system 600 also preferably includes random access memory (RAM) 603, which may be SRAM, DRAM, SDRAM, or the like. Computer system 600 preferably includes read-only memory (ROM) 604 which may be PROM, EPROM, EEPROM, or the like. RAM 603 and ROM 604 hold user and system data and programs, as is well known in the art.

Computer system 600 also preferably includes input/output (I/O) adapter 605, communications adapter 611, user interface adapter 608, and display adapter 609. I/O adapter 605, user interface adapter 608, and/or communications adapter 611 may, in certain embodiments, enable a user to interact with computer system 600 in order to input information, such as commands to monitor particular performance criteria, such as delay, delay variation, and packet loss.

I/O adapter 605 preferably connects to storage device(s) 606, such as one or more of hard drive, compact disc (CD) drive, floppy disk drive, tape drive, etc. to computer system 600. Communications adapter 611 is preferably adapted to couple computer system 600 to network 612 (e.g., communication network 101 described in FIGS. 1A-C). User interface adapter 608 couples user input devices, such as keyboard 613, pointing device 607, and microphone 614 and/or output devices, such as speaker(s) 615 to computer system 600. Display adapter 609 is driven by CPU 601 to control the display on display device 610 to, for example, display a user interface for embodiments of the present invention.

It shall be appreciated that the present invention is not limited to the architecture of system 600. For example, any suitable processor-based device may be utilized, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for measuring network performance, said system comprising:
   a measurement unit for analyzing a network;
   a first element in a network, said first element being operable to:
      receive a data packet and to create a clone packet based on said data packet, said clone packet having a destination the same as a destination of said data packet and having information identifying said clone packet as a clone,
      insert said clone packet into a data stream with said data packet;
      create a first sample packet including timing information with regard to said first clone packet at said first element; and
      send said first sample packet to the measurement unit,
   a second element in said network operable to:
      receive said clone packet;
      create a second sample packet including timing information with regard to said clone or data packet at said second element, and
      send said second sample packet to said measurement unit
   wherein the measurement unit correlates the first and second sample packets;
   wherein said measurement unit is further operable to compare said first sample packet to said second sample packet to determine a packet delay for the network; and
   wherein said second element is further operable to inspect a payload of said clone packet and generate a packet filter in response thereto, wherein said packet filter is operable to inspect one or more subsequent data packets and to create one or more sample packets, said one or more sample packets including timing information with regard to said one or more subsequent data packets at said second element.

2. The system of claim 1 wherein said first element includes a probe operable to receive said data packet and to create said clone packet and includes a node operable to insert said clone packet into said data stream.

3. The system of claim 2 wherein said first element is a routing and switching element in said network such that said node is a router and said probe is a line card in said router.

4. The system of claim 1 wherein said first element is operable to perform one or more of:
   sampling said data stream in a statistically random fashion to create said clone packet; and
   sampling said data stream in response to information contained in a header of said data packet.

5. The system of claim 1, wherein said packet filter is operable to inspect said one or more subsequent data packets for packet type and to create said one or more sample packets selectively in response thereto.

6. A method for measuring performance of a network, said method comprising:

a) receiving a data packet from a source by a first element in said network;
   b) generating at the first element a clone packet based on said data packet, said clone packet including information identifying said clone packet as a clone;
   c) the first element inserting said clone packet into a data stream with said data packet;
   d) generating a first sample packet, said first sample packet including a timestamp indicating timing of said clone packet at said first element;
   e) sending said first sample packet to a measurement unit;
   f) receiving said clone packet at a second element;
   g) recognizing said clone packet based on said information identifying said clone packet as a clone;
   h) generating a second sample packet, said second sample packet including a timestamp indicating timing of said clone or data packet at said second element;
   i) sending said second sample packet to said measurement unit; and
   j) comparing said first and second sample packets by said measurement unit to determine a packet delay for said network;
   wherein step f) includes receiving said clone packet by the second element in said network, in which said clone packet includes information specifying a packet filter;
   wherein step h) includes:
      generating said packet filter according to said specifying information;
      inspecting by said packet filter a second data packet; and
      generating the second sample packet in response to inspecting said second data packet.

7. The method of claim 6, further comprising:
   said measurement unit comparing said packet delay for said network with a plurality of stored packet delay values to calculate a packet delay variation for said network.

8. The method of claim 6, further comprising: checking for presence of one or more subsequent sample packets based on said data packet by said measurement unit to determine whether packet loss exists in said network.

9. The method of claim 6, wherein said first sample packet includes one or more of: a unique identification assigned by said first element to said clone packet for correlating results at said measurement unit; and an encapsulated copy of said clone packet.

10. The method of claim 6, further comprising:
    said measurement unit comparing said sample packet to one or more subsequent sample packets to determine a packet delay for said network.

11. The method of claim 6, wherein said inspecting by said packet filter a second data packet includes: inspecting said data stream at said second element for destination information; and sampling said second data packet selectively in response to said destination information.

12. The method of claim 6 wherein said clone packet includes one or more of:
    information indicating a destination the same as a destination for said data packet;
    information indicating a port different from a port used by said destination of said data packet;
    instructions directing a second element to create a packet filter, said packet filter sampling a data stream based on predetermined criteria; and
    a unique identification assigned by said first element for correlating results at a downstream measurement unit.

13. The method of claim 6 wherein said first element is a routing a switching element in said network and includes a node and a probe, wherein the node is a router and the probe is a line card in the router, wherein said receiving said data packet includes the line card of the first element sampling a data stream and selecting said data packet, and wherein the router of the first element generates the clone packet based on the data packet.

14. A system for measuring one or more performance parameters of a network, said system comprising:
- means for sampling a first data packet from a data stream;
- means for generating a clone packet at a first node based on said first data packet, said clone packet including a destination of said clone packet that is the same as a destination of said first data packet, said clone packet further including data indicating that said clone packet is different from ordinary traffic;
- means for sending said first data packet and said clone packet to a second node along the same route;
- means for generating a first sample packet in response to said first data packet, said first sample packet including a timestamp indicating timing of said clone packet at said first node; and
- means for sending said sample packet to a measurement unit;
- means for receiving said clone packet at the second node;
- means for generating a second sample packet in response to said data including a timestamp indicating timing of said clone packet at said second node; and
- means for sending said second sample packet to the measurement unit;
- wherein the second node:
  - receives the clone packet including information specifying a packet filter;
  - generates said packet filter according to said specifying information;
  - inspects a second data packet using the packet filter;
  - generates the second sample packet in response to inspecting said second data packet; and
  - sends said second sample packet to the measurement unit.

15. The system of claim 14, wherein the measurement unit calculates a packet delay for said network by comparing said first sample packet to said second sample packets.

16. The system of claim 14, further wherein the measurement unit calculates a packet delay for said network by comparing said first and second sample packets.

* * * * *